United States Patent
Mullins

(10) Patent No.: US 9,626,801 B2
(45) Date of Patent: Apr. 18, 2017

(54) VISUALIZATION OF PHYSICAL CHARACTERISTICS IN AUGMENTED REALITY

(71) Applicant: DAQRI, LLC, Los Angeles, CA (US)

(72) Inventor: Brian Mullins, Sierra Madre, CA (US)

(73) Assignee: DAQRI, LLC, Los Angeles, CA (US)

( * ) Notice: Subject to any disclaimer, the term of this patent is extended or adjusted under 35 U.S.C. 154(b) by 293 days.

(21) Appl. No.: 14/145,567

(22) Filed: Dec. 31, 2013

(65) Prior Publication Data
US 2015/0187138 A1 Jul. 2, 2015

(51) Int. Cl.
*G06T 19/00* (2011.01)
*G06K 9/00* (2006.01)

(52) U.S. Cl.
CPC ........ *G06T 19/006* (2013.01); *G06K 9/00671* (2013.01)

(58) Field of Classification Search
CPC .......... G02B 27/017; G02B 2027/0178; G02B 27/0093; G02B 2027/0138; G06T 19/006; G06T 2207/30004; G06T 7/0012; G06T 2210/41
See application file for complete search history.

(56) References Cited

U.S. PATENT DOCUMENTS

| | | | |
|---|---|---|---|
| 6,847,336 B1 * | 1/2005 | Lemelson | A61B 1/00048 345/8 |
| 8,830,267 B2 * | 9/2014 | Brackney | G06Q 10/06 345/632 |
| 2004/0095352 A1 | 5/2004 | Huang | |
| 2005/0203367 A1 | 9/2005 | Ahmed | |
| 2012/0069051 A1 | 3/2012 | Hagbi et al. | |
| 2013/0127980 A1 | 5/2013 | Haddick et al. | |
| 2013/0346168 A1 | 12/2013 | Zhou et al. | |
| 2014/0194896 A1 | 7/2014 | Frimer et al. | |
| 2014/0279345 A1 * | 9/2014 | Burns | G06Q 40/04 705/37 |
| 2015/0088546 A1 * | 3/2015 | Balram | G06F 19/322 705/3 |
| 2015/0325148 A1 * | 11/2015 | Kim | G09B 23/288 434/265 |
| 2016/0049005 A1 | 2/2016 | Mullins et al. | |

FOREIGN PATENT DOCUMENTS

WO WO-2015102862 A1 7/2015

OTHER PUBLICATIONS

"International Application Serial No. PCT/US2014/070298, International Search Report mailed Mar. 18, 2015", 2 pgs.

(Continued)

*Primary Examiner* — Jeffrey Chow
(74) *Attorney, Agent, or Firm* — Schwegman Lundberg & Woessner, P.A.

(57) ABSTRACT

A system and method for visualization of physical characteristics are described. A sensor coupled to an object generates live data. Physical characteristics of the object are computed using the live data. A visualization of the physical characteristics of the object is generated and communicated to a viewing device configured to capture an image of the object. The viewing device augments the image of the object with the visualization of the physical characteristics of the object.

20 Claims, 11 Drawing Sheets

(56) References Cited

OTHER PUBLICATIONS

"International Application Serial No. PCT/US2014/070298, Written Opinion mailed Mar. 18, 2015", 4 pgs.
"Application Serial No. PCT/US2014/070298, International Preliminary Report on Patentability mailed Dec. 18, 2015", 16 pgs.
"U.S. Appl. No. 14/461,257, Non Final Office Action mailed May 5, 2016", 21 pgs.
Haouchine, et al., "Towards an Accurate Tracking of Liver Tumors for Augmented Reality in Robotic Assisted Surgery", International Conference on Robotics and Automation (ICRA), (Jun. 2014), 4121-4126.

\* cited by examiner

VISUALIZATION OF PHYSICAL CHARACTERISTICS IN AUGMENTED REALITY

TECHNICAL FIELD

The subject matter disclosed herein generally relates to the processing of data. Specifically, the present disclosure addresses systems and methods for visualization of physical characteristics in augmented reality.

BACKGROUND

A device can be used to generate and display data in addition to an image captured with the device. For example, augmented reality (AR) is a live, direct or indirect view of a physical, real-world environment whose elements are augmented by computer-generated sensory input such as sound, video, graphics or GPS data. With the help of advanced AR technology (e.g., adding computer vision and object recognition) the information about the surrounding real world of the user becomes interactive. Device-generated (e.g., artificial) information about the environment and its objects can be overlaid on the real world.

BRIEF DESCRIPTION OF THE DRAWINGS

Some embodiments are illustrated by way of example and not limitation in the figures of the accompanying drawings.

DETAILED DESCRIPTION

Figure 1:
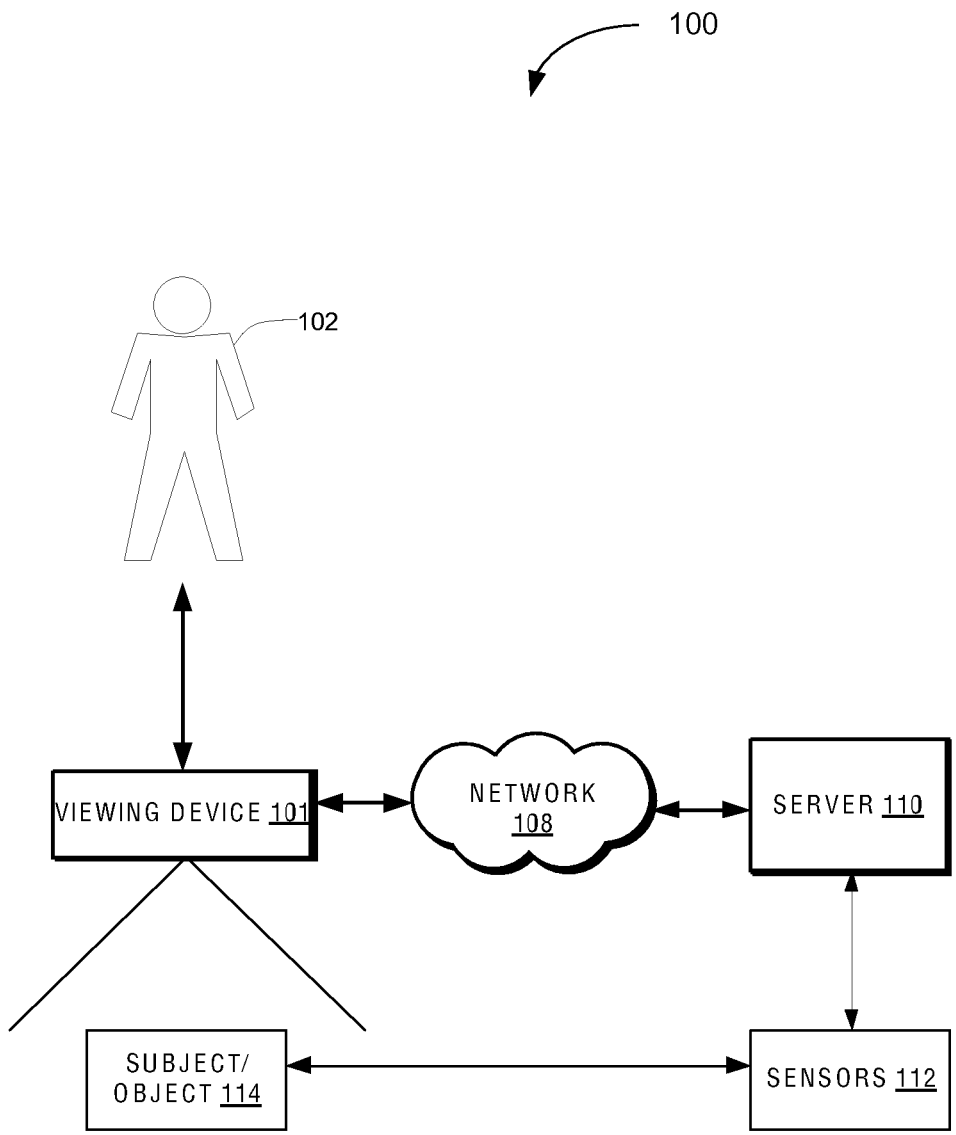
FIG. 1 is a block diagram illustrating an example of a network suitable for assigning a virtual user interface to a physical object, according to some example embodiments.

Example methods and systems are directed to data manipulation based on real world object manipulation. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality applications allow a user to experience information, such as in the form of a three-dimensional virtual object overlaid on an image of a physical object captured by a camera of a viewing device. The physical object may include a visual reference that the augmented reality application can identify. A visualization of the additional information, such as the three-dimensional virtual object overlaid or engaged with an image of the physical object, is generated in a display of the device. The three-dimensional virtual object may be selected based on the recognized visual reference or captured image of the physical object. A rendering of the visualization of the three-dimensional virtual object may be based on a position of the display relative to the visual reference. Other augmented reality applications allow a user to experience visualization of the additional information overlaid on top of a view or an image of any object in the real physical world. The virtual object may include a three-dimensional virtual object, a two-dimensional virtual object. For example, the three-dimensional virtual object may include a three-dimensional view of a chair or an animated dinosaur. The two-dimensional virtual object may include a two-dimensional view of a dialog box, menu, or written information such as statistics information for a baseball player. An image of the virtual object may be rendered at the viewing device.

A system and method for visualization of physical characteristics are described. A sensor coupled to an object generates live data. Physical characteristics of the object are computed using the live data at a server. A visualization of the physical characteristics of the object is generated and communicated to a viewing device configured to capture an image of the object. The viewing device augments the image of the object with the visualization of the physical characteristics of the object.

In one example embodiment, the server receives an identification of the object from the viewing device and accesses live data corresponding to the identification of the object. The live data may be communicated to the viewing device that computes physical characteristics of the object using the live data and generates the visualization of the physical characteristics of the object.

In another example embodiment, the viewing device displays the visualization of the physical characteristics of the object in relation to the image of the object in a display of the viewing device. The visualization can include an animation with movements based on the live data or visual indicators having shapes and colors that change according to the live data. The physical characteristics of the object may include a weight, a force, a pressure, a heart rate, a pressure rate, or EEG data.

In another example embodiment, the server accesses historical physical characteristics of the object and generates a visualization that compares the physical characteristics of the object to the historical physical characteristics of the object.

In another example embodiment, the server receives a parameter related to the object from the viewing device, computes modified physical characteristics of the object based on the live data affected by the parameter, generates a visualization of the modified physical characteristics of the object, and communicates the visualization of the modified physical characteristics of the object to the viewing device.

In another example embodiment, the server renders a virtual object using the computed physical features, and communicates the rendered virtual object to the viewing device. The viewing device displays the rendered virtual object in relation to a position of the viewing device relative to the object.

In another example embodiment, the viewing device includes an optical device configured to capture the image of the object and a display configured to display the visualization of the physical characteristics of the object in a transparent display. A position and size of the visualization of the physical characteristics of the object in the transparent display may be based on a position and orientation of the viewing device relative to the object.

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating an augmented reality application of a device, according to some example embodiments. The network environment 100 includes a viewing device 101 and a server 110, communicatively coupled to each other via a network 108. The viewing device 101 and the server 110 may each be implemented in a computer system, in whole or in part, as described below with respect to FIGS. 2 and 5.

The server 110 may be part of a network-based system. For example, the network-based system may be or include a cloud-based server system that provides additional information, such as three-dimensional models, to the viewing device 101.

A user 102 may utilize the viewing device 101 to capture a view of a physical object (e.g., a bridge) or a subject (e.g., a human being) in a local real world environment. The user 102 may be a human user (e.g., a human being), a machine user (e.g., a computer configured by a software program to interact with the viewing device 101), or any suitable combination thereof (e.g., a human assisted by a machine or a machine supervised by a human). The user 102 is not part of the network environment 100, but is associated with the viewing device 101 and may be a user 102 of the viewing device 101. For example, the viewing device 101 may be a computing device with a display such as a smartphone, a tablet computer, or a wearable computing device (e.g., watch or glasses). The computing device may be hand held or may be removably mounted to the head of the user 102. In one example, the display may be a screen that displays what is captured with a camera of the viewing device 101. In another example, the display of the viewing device 101 may be transparent or semi-transparent such as in lenses of wearable computing glasses.

The user 102 may be a user of an augmented reality application in the viewing device 101 and at the server 110. The augmented reality application may provide the user 102 with an experience triggered by a subject or a physical object, such as a two-dimensional physical object (e.g., a picture), a three-dimensional physical object (e.g., a factory machine), a location (e.g., at the bottom floor of a factory), or any references (e.g., perceived corners of walls or furniture) in the real world physical environment. For example, the user 102 may point a camera of the viewing device 101 to capture an image of a subject/object 114.

In one embodiment, the image is tracked and recognized locally in the viewing device 101 using a local context recognition dataset or any other previously stored dataset of the augmented reality application of the viewing device 101. The local context recognition dataset module may include a library of virtual objects associated with real-world physical objects or references. In one example, the viewing device 101 identifies feature points in an image of the subject/object 114 to determine different planes (e.g., edges, corners, surface of the machine). The viewing device 101 also identifies tracking data related to the subject/object 114 (e.g., GPS location of a bridge, facing west, e.g., viewing device 101 standing x meters away from the bridge, etc.). If the captured image is not recognized locally at the viewing device 101, the viewing device 101 downloads additional information (e.g., the three-dimensional model) corresponding to the captured image, from a database of the server 110 over the network 108.

In another embodiment, the image is tracked and recognized remotely at the server 110 using a remote context recognition dataset or any other previously stored dataset of an augmented reality application in the server 110. The remote context recognition dataset module may include a library of virtual objects associated with real-world physical objects or references.

Sensors 112 coupled to the subject/object 114 may measure physical properties on the subject/object 114. For example, sensors 112 may be disposed throughout a span of a bridge to measure movement, pressure, orientation, temperature, etc. The server 110 can compute physical characteristics of the subject/object 114 using the live data generated by the sensors 112. For example, the server 110 can compute the amount of stress at specific locations throughout the bridge as cars drive over the bridge. The server 110 can generate virtual indicators such as vectors or colors based on the computed physical characteristics of the subject/object 114. The virtual indicators are then overlaid on top of a live image of the subject/object 114 to show the amount of real-time stress on the bridge. For example, the virtual indicators may include arrows with shapes and colors that change based on real-time data. The visualization may be provided to the viewing device 101 so that the viewing device 101 can render the virtual indicators in a display of the viewing device 101. In another embodiment, the virtual indicators are rendered at the server 110 and streamed to the viewing device 101. The viewing device 101 displays the virtual indicators or visualization corresponding to a display of the subject/object 114. For example, the virtual arrows are positioned at locations corresponding to the amount of stress measured on the bridge.

In another example, the sensors 112 may include a blood pressure and heart rate monitor coupled to a subject. For example, the server 110 can generate a picture of a heart with a beating animation with a pace corresponding to the measured hear rate from the sensors 112. The server 110 may change a color of the heart based on the measured blood pressure. The live animation is provided to the viewing device 101 such that the picture of the heart is displayed on top of a chest area of the subject 114 in the display of the viewing device 101. The position of the picture of the heart may be determined based on the orientation and position of the viewing device 101 relative to the subject using sensors (e.g., gyroscope) internal to the viewing device 101.

The sensors 112 may include other sensors used to track the location and orientation of the viewing device 101 externally without having to rely on the sensors internal to the viewing device 101. The tracking sensors 112 may include optical sensors (e.g., depth-enabled 3D camera), wireless sensors (Bluetooth, Wi-Fi), GPS sensor, and audio sensor to determine the location of the user 102 having the viewing device 101, distance of the user 102 to the tracking sensors 112 in the physical environment (e.g., sensors placed in corners of a venue or a room), the orientation of the viewing device 101 to track what the user 102 is looking at (e.g., direction at which the viewing device 101 is pointed, viewing device 101 pointed towards a player on a tennis court, viewing device 101 pointed at a person in a room).

In another embodiment, data from the tracking sensors 112 and internal sensors in the viewing device 101 may be used for analytics data processing at the server 110 (or another server) for analysis on usage and how the user 102 is interacting with the physical environment. Live data from other servers from other servers may also be used in the analytics data processing. For example, the analytics data may track at what locations (e.g., points or features) on the physical or virtual object the user 102 has looked, how long the user 102 has looked at each location on the physical or virtual object, how the user 102 held the viewing device 101 when looking at the physical or virtual object, which features of the virtual object the user 102 interacted with (e.g., such as whether a user 102 tapped on a link in the virtual object), and any suitable combination thereof. The viewing device 101 receives a visualization content dataset related to the analytics data. The viewing device 101 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 12, 13. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
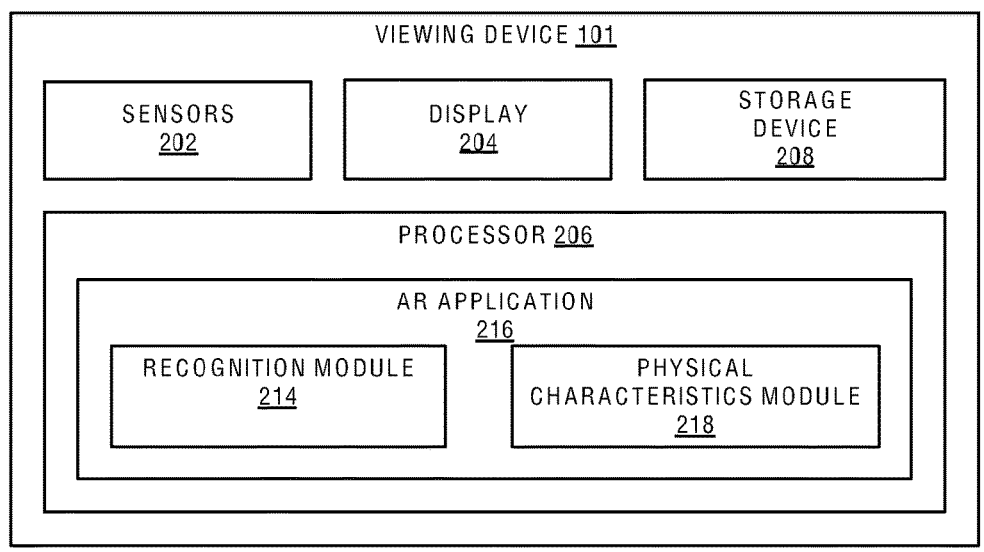
FIG. 2 is a block diagram illustrating an example embodiment of modules (e.g., components) of a viewing device.

FIG. 2 is a block diagram illustrating modules (e.g., components) of the viewing device 101, according to some example embodiments. The viewing device 101 may include sensors 202, a display 204, a processor 206, and a storage device 208. For example, the viewing device 101 may be a wearing computing device, desktop computer, a vehicle computer, a tablet computer, a navigational device, a portable media device, or a smart phone of a user. The user may be a human user (e.g., a human being), a machine user (e.g., a computer configured by a software program to interact with the viewing device 101), or any suitable combination thereof (e.g., a human assisted by a machine or a machine supervised by a human).

The sensors 202 may include, for example, a proximity or location sensor (e.g., Near Field Communication, GPS, Bluetooth, Wi-Fi), an optical sensor (e.g., camera), an orientation sensor (e.g., gyroscope), an audio sensor (e.g., a microphone), or any suitable combination thereof. For example, the sensors 202 may include a rear facing camera and a front facing camera in the viewing device 101. It is noted that the sensors 202 described herein are for illustration purposes; the sensors 202 are thus not limited to the ones described. The sensors 202 may be used to generate internal tracking data of the viewing device 101 to determine what the viewing device 101 is capturing or looking at in the real physical world.

The display 204 may include, for example, a touchscreen display configured to receive a user input via a contact on the touchscreen display. In one example, the display 204 may include a screen or monitor configured to display images generated by the processor 206. In another example, the display 204 may be transparent or semi-opaque so that the user 102 can see through the display 204 (e.g., Head-Up Display).

The processor 206 may include an augmented reality application 216 for creating a virtual display of real-time or live physical characteristics related to an object when the viewing device 101 captures an image of an object or a subject. In one example embodiment, the augmented reality application 216 may include a recognition module 214 and a physical characteristics module 218.

Figure 3:
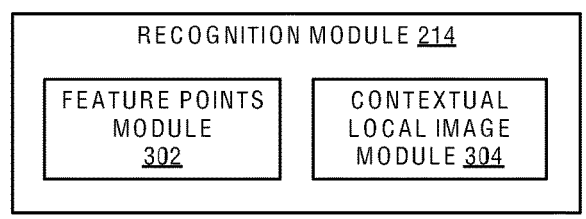
FIG. 3 is a block diagram illustrating an example embodiment of modules of a recognition module.

The recognition module 214 identifies the object that the viewing device 101 is pointed to. The recognition module 214 may detect, generate, and identify identifiers such as feature points of the physical object being viewed or pointed at the viewing device 101 using an optical device of the viewing device 101 to capture the image of the physical object. As such, the recognition module 214 may be configured to identify a physical object. In one example embodiment, the recognition module 214 may include a feature points module 302 and a contextual local image module 304 as illustrated in FIG. 3. The identification of the object may be performed in many different ways. For example, the feature points module 302 may determine feature points of the object based on several image frames of object. The feature points module 302 also determines the identity of the object using any visual recognition algorithm. In another example, a unique identifier may be associated with the object. The unique identifier may be a unique wireless signal or a unique visual pattern such that the recognition module 214 can look up the identity of the object based on the unique identifier from a local or remote content database. In another example embodiment, the recognition module 214 includes a facial recognition algorithm to determine an identity of a subject. The contextual local image module 304 may be configured to determine whether the captured image matches an image locally stored in a local database of images and corresponding additional information (e.g., three-dimensional model and interactive features) on the viewing device 101. In one embodiment, the contextual local image module 304 retrieves a primary content dataset from the server 110, and generates and updates a contextual content dataset based an image captured with the viewing device 101.

Figure 4:
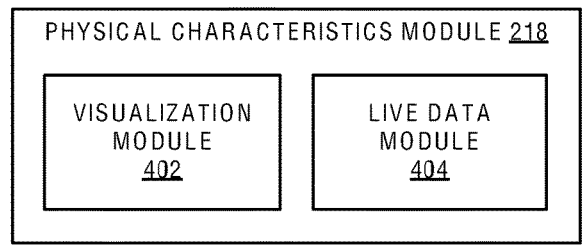
FIG. 4 is a block diagram illustrating an example embodiment of modules of a physical characteristics module.

The physical characteristics module 218 determines information or status including physical characteristics related to the object. In one example embodiment, the physical characteristics module 218 may include a visualization module 402 and a live data module 404 as illustrated in FIG. 4. The visualization module 402 may generate a visualization of the live physical characteristics related to the object. The visualization may include rendering a three-dimensional object (e.g., model of a beating heart) or a two-dimensional object (e.g., arrow or symbols). In one example embodiment, the visualization module 402 receives data from the server 110 to render the visualization. In another example embodiment, the visualization module 402 receives the rendered object. The visualization module 402 further determines the position and size of the rendered object to be displayed in relation to an image of the object. For example, the visualization module 402 places the animated heart with the size and position based on the image of the subject such that the animated heart is displayed on the chest of the subject with the appropriate size. The visualization module 402 may track the image of the subject and render the virtual object based on the position of the image of the subject in a display of the viewing device 101.

The live data module 404 communicates with the server 110 to receive live data related to physical characteristics of the object or subject. In another embodiment, the object may broadcast live data from sensors internal to the object. For example, the object may have sensors embedded in it. The sensors can broadcast real time data to the live data module 404 of the viewing device 101 and the server 110. The live data module 404 may receive the live data after authentication with the object. In another example, the live data module 404 can receive computed physical characteristics from the server 110, or live raw data from sensors 112.

In one example embodiment, the viewing device 101 accesses from a local memory a visualization model (e.g., vector shapes) corresponding to the image of the object (e.g., bridge). In another example, the viewing device 101 receives a visualization model corresponding to the image of the object from the server 110. The viewing device 101 then renders the visualization model to be displayed in relation to an image of the object being displayed in the viewing device 101 or in relation to a position and orientation of the viewing device 101 relative to the object. The augmented reality application 216 may adjust a position of the rendered visualization model in the display 204 to correspond with the last tracked position of the object (as last detected either from the sensors 202 of the viewing device 101 or from the tracking sensors 112 of the server 110).

The visualization module 402 may include a local rendering engine that generates a visualization of a three-dimensional virtual object overlaid (e.g., superimposed upon, or otherwise displayed in tandem with) on an image of a physical object captured by a camera of the viewing device 101 in the display 204 of the viewing device 101. A visualization of the three-dimensional virtual object may be manipulated by adjusting a position of the physical object (e.g., its physical location, orientation, or both) relative to the camera of the viewing device 101. Similarly, the visualization of the three-dimensional virtual object may be manipulated by adjusting a position of the camera of the viewing device 101 relative to the physical object.

In one example embodiment, the visualization module 402 may retrieve three-dimensional models of virtual objects associated with a captured real world object. For example, the captured image may include a visual reference (also referred to as a marker) that consists of an identifiable image, symbol, letter, number, machine-readable code. For example, the visual reference may include a bar code, a quick response (QR) code, or an image that has been previously associated with a three-dimensional virtual object (e.g., an image that has been previously determined to correspond to the three-dimensional virtual object).

In one example embodiment, the visualization module 402 may include a manipulation module that identifies the physical object (e.g., a physical telephone), access virtual functions (e.g., increase or lower the volume of a nearby television) associated with physical manipulations (e.g., lifting a physical telephone handset) of the physical object, and generate a virtual function corresponding to a physical manipulation of the physical object.

The storage device 208 may be configured to store a database of identifiers of physical object, tracking data, and corresponding virtual user interfaces. In another embodiment, the database may also include visual references (e.g., images) and corresponding experiences (e.g., three-dimensional virtual objects, interactive features of the three-dimensional virtual objects). For example, the visual reference may include a machine-readable code or a previously identified image (e.g., a picture of a shoe). The previously identified image of the shoe may correspond to a three-dimensional virtual model of the shoe that can be viewed from different angles by manipulating the position of the viewing device 101 relative to the picture of the shoe. Features of the three-dimensional virtual shoe may include selectable icons on the three-dimensional virtual model of the shoe. An icon may be selected or activated by tapping or moving on the viewing device 101.

In one embodiment, the storage device 208 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images or the most popular images determined by the server 110. The core set of images may include a limited number of images identified by the server 110. For example, the core set of images may include the images depicting covers of the ten most popular magazines and their corresponding experiences (e.g., virtual objects that represent the ten most popular magazines). In another example, the server 110 may generate the first set of images based on the most popular or often scanned images received at the server 110. Thus, the primary content dataset does not depend on objects or images scanned by the recognition module 214 of the viewing device 101.

The contextual content dataset includes, for example, a second set of images and corresponding experiences (e.g., three-dimensional virtual object models) retrieved from the server 110. For example, images captured with the viewing device 101 that are not recognized (e.g., by the server 110) in the primary content dataset are submitted to the server 110 for recognition. If the captured image is recognized by the server 110, a corresponding experience may be downloaded at the viewing device 101 and stored in the contextual content dataset. Thus, the contextual content dataset relies on the context in which the viewing device 101 has been used. As such, the contextual content dataset depends on objects or images scanned by the recognition module 214 of the viewing device 101.

In one embodiment, the viewing device 101 may communicate over the network 108 with the server 110 to retrieve a portion of a database of visual references, corresponding three-dimensional virtual objects, and corresponding interactive features of the three-dimensional virtual objects. The network 108 may be any network that enables communication between or among machines, databases, and devices (e.g., the viewing device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 5:
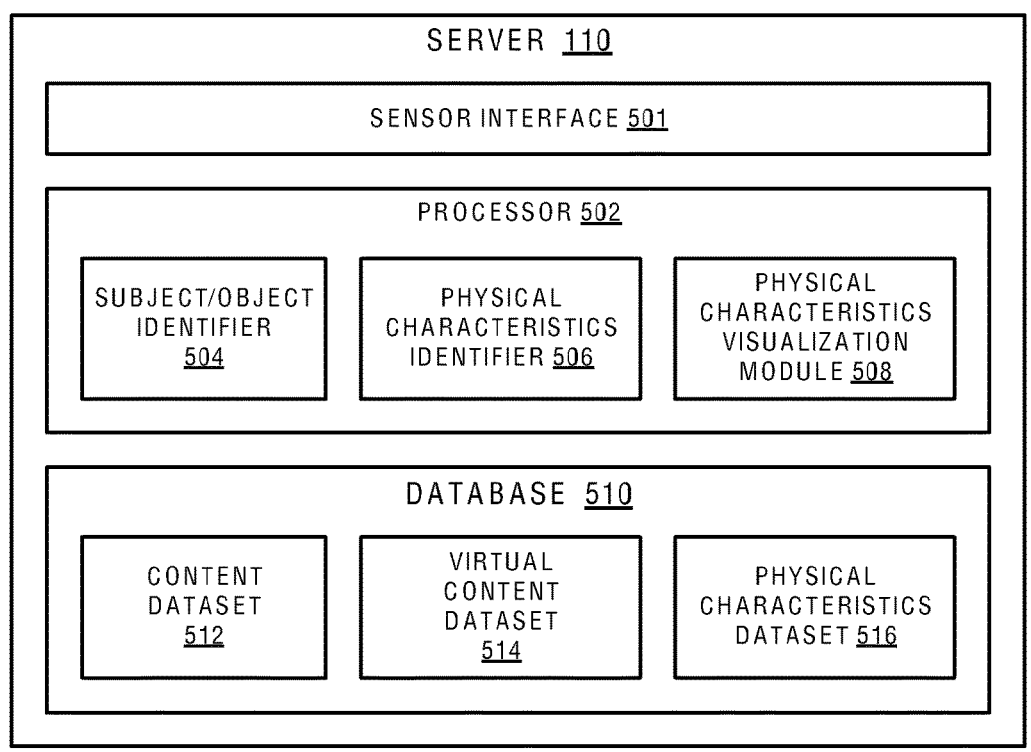
FIG. 5 is a block diagram illustrating an example embodiment of modules of a server.

FIG. 5 is a block diagram illustrating modules (e.g., components) of the server 110. The server 110 includes a sensor interface 501, a processor 502, and a database 510. The sensor interface 501 may communicate with the sensors 112 (FIG. 1) to receive real time data.

The processor 502 may include a subject/object identifier 504, a physical characteristics identifier 506, and a physical characteristics visualization module 508. The subject/object identifier 504 may operate similarly to the recognition module 214 of the viewing device 101. For example, the subject/object identifier 504 may identify an subject/object 114 based on a picture being received from the viewing device 101. In another example, the viewing device 101 already has identified the subject/object 114 and has provided the identification information to the subject/object identifier 504.

The physical characteristics identifier 506 may determine the physical characteristics associated with the subject/object 114 identified. For example, if the subject/object 114 is bridge "abc" at location x, the physical characteristics may include the number of cars driven on the bridge during rush hours, the amount of stress on a particular span of the bridge, the temperature of the pavement in the middle of the bridge, etc.

The physical characteristics visualization module 508 generates a graphical visualization based on the real time data of the physical characteristics of subject/object 114. For example, the physical characteristics visualization module 508 may generate arrows or vectors corresponding to sections of the bridge. In another embodiment, the physical characteristics visualization module 508 may generate a visual model based on the real time data of the physical characteristics. For example, the visual model may include a three dimensional model of the bridge.

The database 510 may store a content dataset 512, a virtual content dataset 514, and physical characteristics dataset 516. The content dataset 512 may store a primary content dataset and a contextual content dataset. The primary content dataset comprises a first set of images and corresponding virtual object models. The subject/object identifier 504 determines that a captured image received from the viewing device 101 is not recognized in the content dataset, and generates the contextual content dataset for the viewing device 101. The contextual content dataset may include a second set of images and corresponding virtual object models. The virtual content dataset 514 includes models of virtual objects to be generated upon receiving a notification associated with an image of a corresponding physical object. The physical characteristics dataset 516 includes a table of identified subjects/objects with corresponding physical characteristics.

Figure 6:
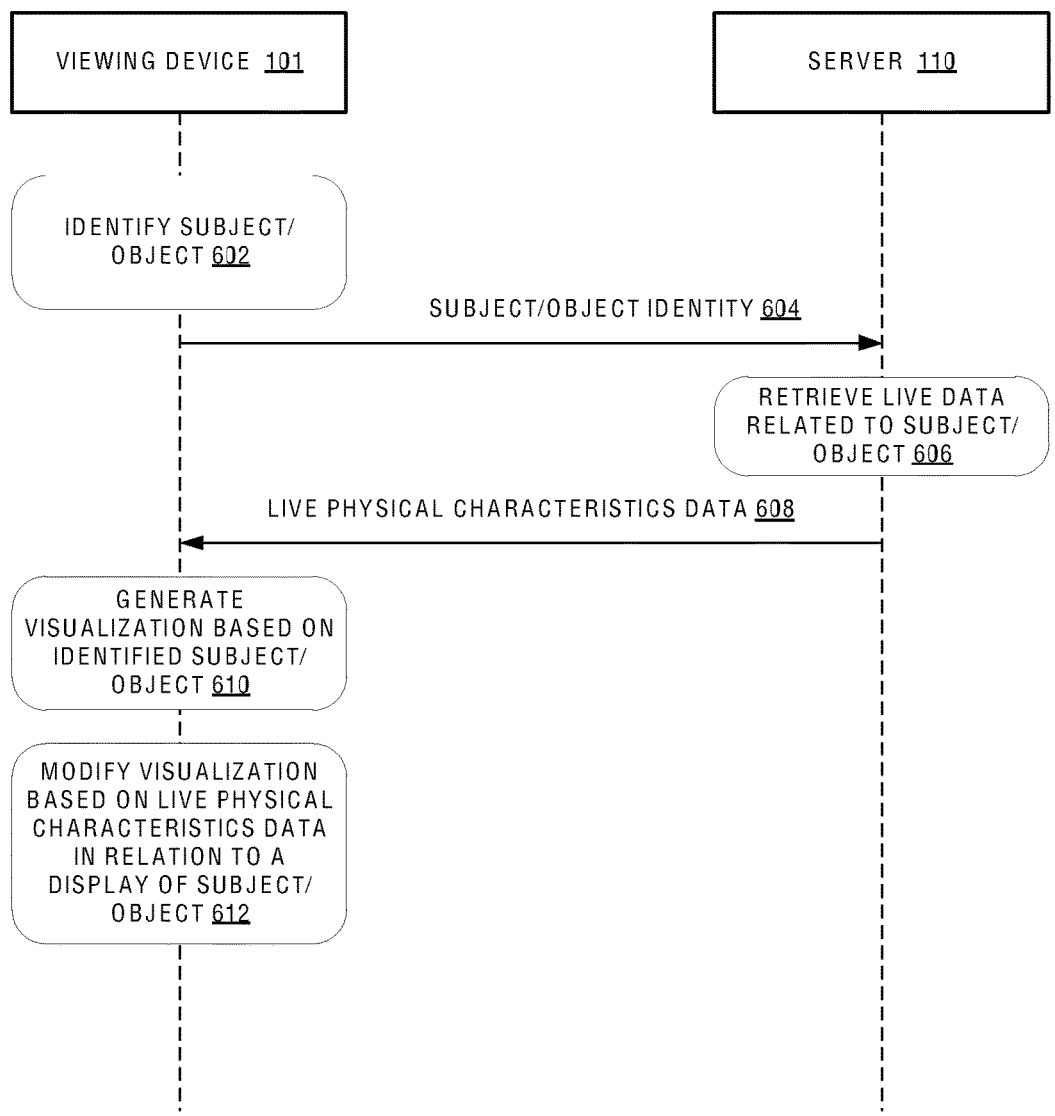
FIG. 6 is a ladder diagram illustrating an example embodiment of training an augmented reality application at a viewing device.

FIG. 6 is a ladder diagram illustrating an example embodiment of a system for visualizing physical characteristics in an augmented reality application of a viewing device and a server. At operation 602, the viewing device 101 identifies a subject or object (e.g., subject/object 114) and tracks data related to the subject/object being captured by the viewing device 101. At operation 604, the viewing device 101 communicates the identity of the subject/object being tracked to the server 110. At operation 606, the server 110 retrieves live data related to the subject/object and computes physical characteristics of the subject/object. At operation 608, the server 110 sends the live physical characteristics of the subject/object to the viewing device 101. At operation 610, the viewing device 101 generates a visualization based on the live physical characteristics of the subject/object. For example, a virtual heart may be displayed on an image of a chest of the identified subject. In another example, the visualization may be projected onto another object. For example, the viewing device 101 points to a physical plastic heart model in the physician's office. The viewing device 101 then starts to animate a virtual heart over the image of the plastic heart model based on the live heartbeat of a patient/subject. As such, the viewing device 101 may recognize the object as a plastic heart model and request live data from any sensor connected to any patient. Furthermore, the viewing device 101 may be moved around the physical plastic heart. The visualization is accordingly modified based on the position of the viewing device 101 relative to the plastic heart so as to show from a different angle. Thus, the visualization of live data from one object may be projected on an image of another object.

At operation 612, the viewing device 101 modifies (e.g., animates) the visualization based on the live physical characteristics of the subject/object in relation to a display of the subject/object.

Figure 7:
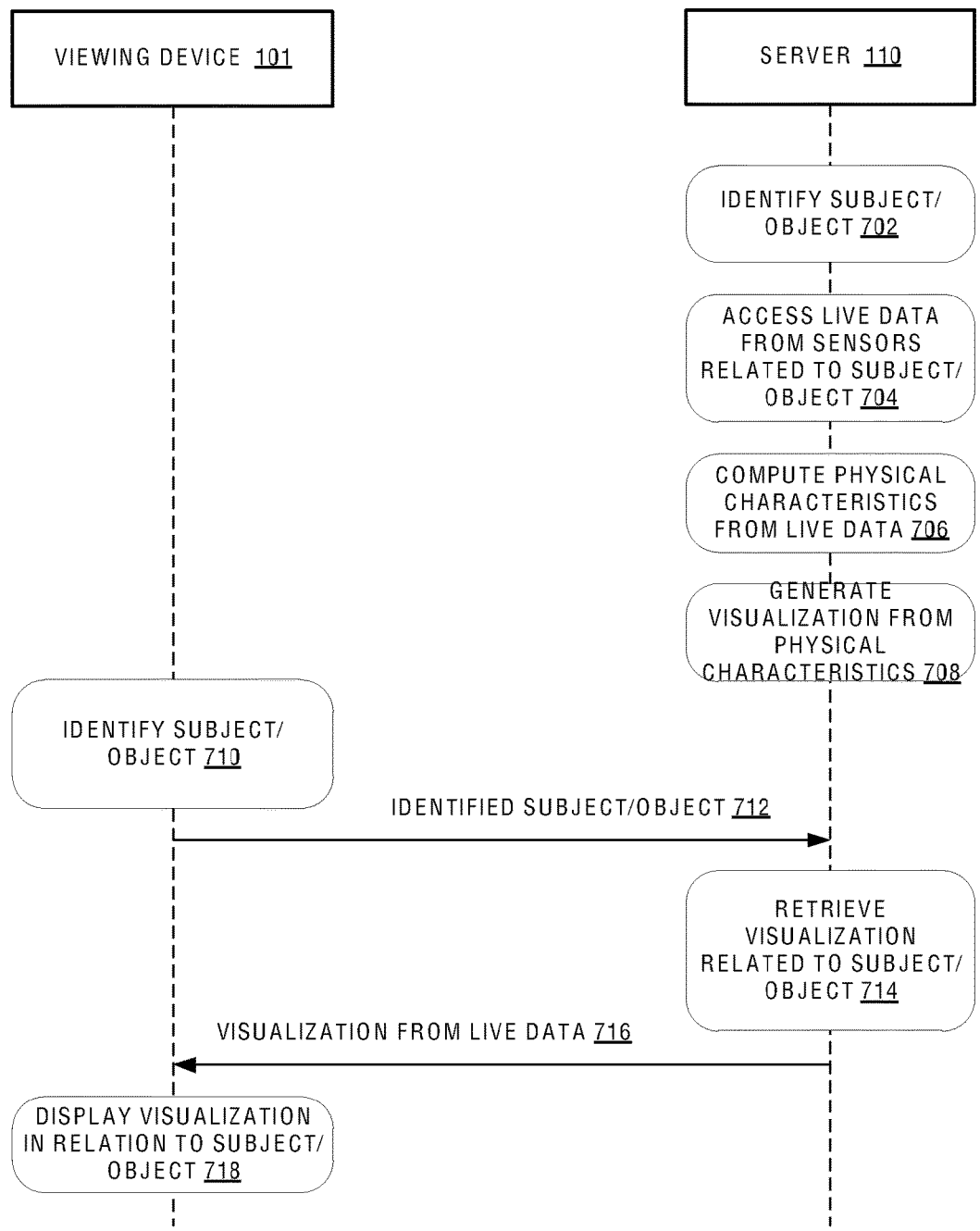
FIG. 7 is a ladder diagram illustrating an example embodiment of training an augmented reality application at a server.

FIG. 7 is a ladder diagram illustrating an example embodiment of training an augmented reality application at a viewing device. At operation 702, the server 110 identifies a physical object. At operation 704, the server 110 accesses live data from sensors related to the subject/object. At operation 706, the server 110 computes physical characteristics of the subject/object from the live data. At operation 708, the server 110 generates a visualization from the computed physical characteristics. At operation 710, the viewing device 101 identifies a subject/object. At operation 712, the viewing device 101 communicates an identification of the identified subject/object to the server 110. At operation 714, the server 110 retrieves a visualization related to the identified subject/object. At operation 716, the server 110 sends the visualization from the live data to the viewing device 101. At operation 718, the viewing device 101 displays a visualization in relation to the subject/object.

Figure 8:
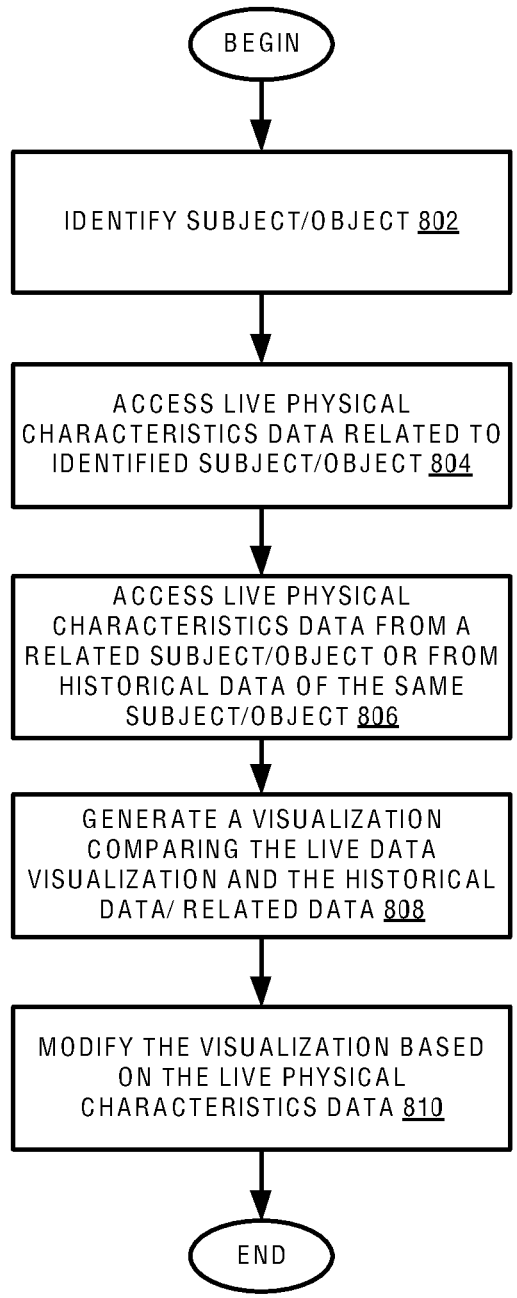
FIG. 8 is a flowchart illustrating an example operation of comparing visualization physical characteristics of real world objects in an augmented reality application.

FIG. 8 is a flowchart illustrating an example operation of comparing visualization physical characteristics of real world objects in an augmented reality application. At operation 802, the viewing device identifies a subject or/and an object. At operation 804, the viewing device retrieves live physical characteristics data related to the identified subject/object from a server. At operation 806, the viewing device accesses live physical characteristics data from a related subject/object (e.g., brother of the subject, bridge with similar structure). In another example, the viewing device may access historical data of the same subject/object being viewed. For example, the historical data may be heart beat data from the same subject from a previous day. At 808, the viewing device generates a visualization that compares the live physical characteristics data with the live physical characteristics data from a related subject/object or with historical data of the same subject/object being viewed. Different colors may be used to indicate the differences. At operation 810, the viewing device modifies the visualization based on changes in the live physical characteristics data.

Figure 9:
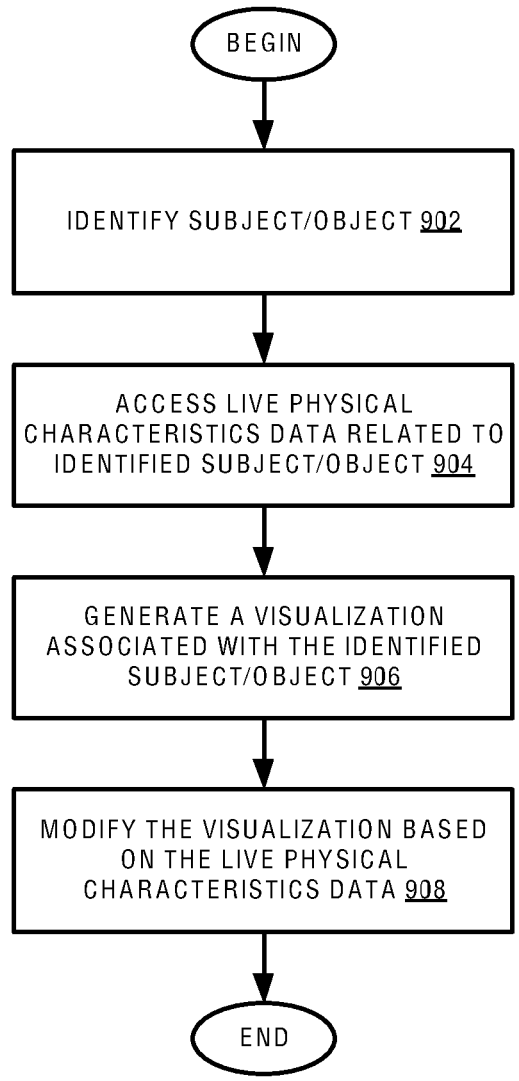
FIG. 9 is a flowchart illustrating an example operation of modifying a visualization physical characteristics of real world objects in an augmented reality application.

FIG. 9 is a flowchart illustrating an example operation of a visualization of physical characteristics in augmented reality at a viewing device. At operation 902, the viewing device identifies a subject/object. At operation 904, the viewing device retrieves live physical characteristics data related to the identified subject/object from a server. At operation 906, the viewing device generates a visualization associated with the identified subject/object. At operation 908, the viewing device modifies the visualization based on the live physical characteristics data.

Figure 10:
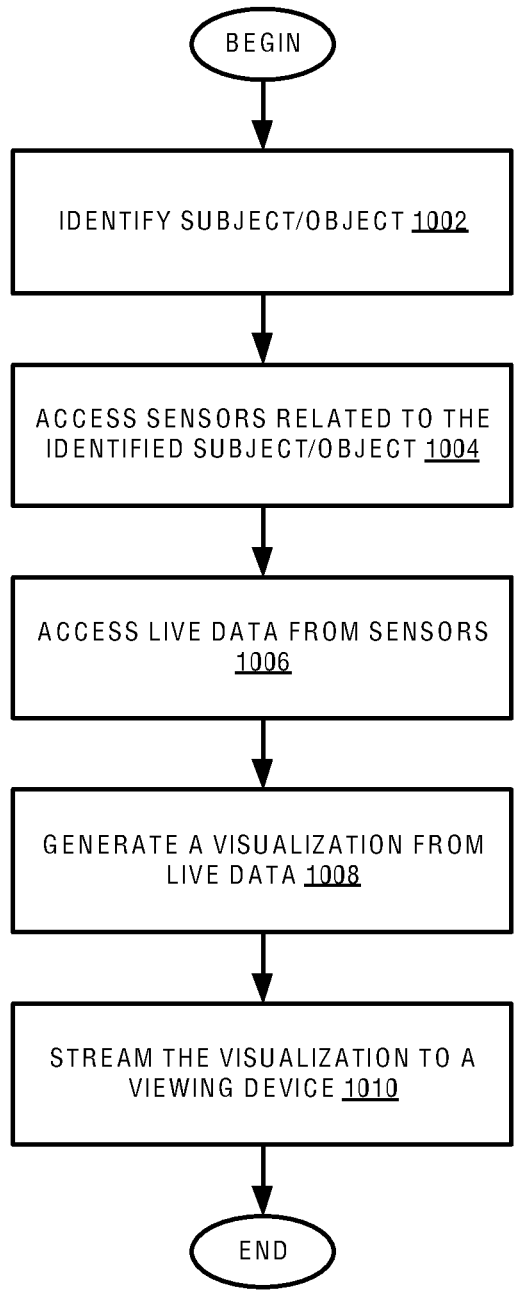
FIG. 10 is a flowchart illustrating an example operation of retrieving a visualization from a server.

FIG. 10 is a flowchart illustrating an example operation of visualization of physical characteristics in augmented reality at a server. At operation 1002, the server identifies the subject/object. At operation 1004, the server identifies sensors related to the identified subject/object. At operation 1006, the server accesses live data from the identified sensors. At operation 1008, the server generates a visualization from the live data. At operation 1010, the server streams the visualization to a viewing device.

Figure 11:
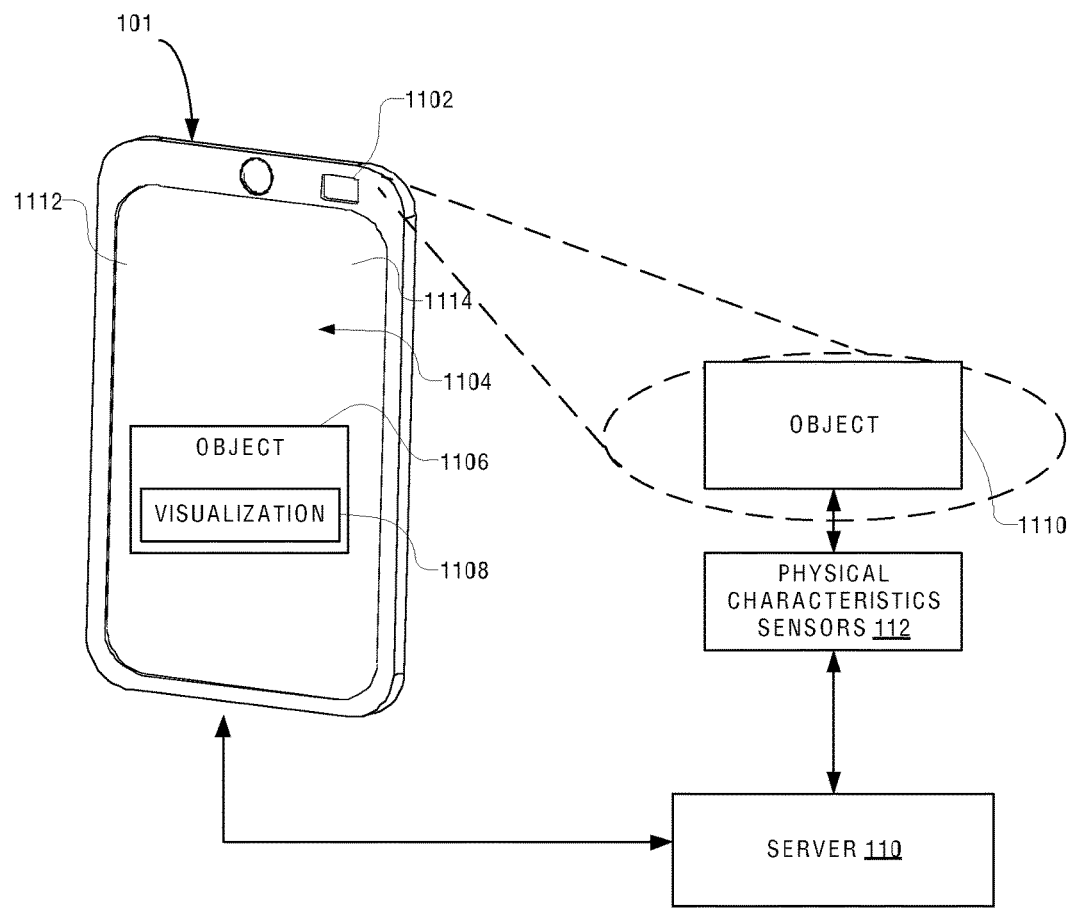
FIG. 11 is a diagram illustrating an example operation of training an augmented reality application at a server.

FIG. 11 is a diagram illustrating an example operation of a visualization of physical characteristics in augmented reality applications. The viewing device 101 may include a handheld mobile device having a rear view camera 1102 and a touch sensitive display 1104. The viewing device 101 may be pointed at an object 1110. The rear view camera 1102 captures an image of the object 1110 and displays a picture 1106 of the object 1110 in the display 1104. Identifiers and tracking data related to the object 1110 may be determined by the viewing device 101 based on the picture 1106 of the object 1110 so as to identify the object 1110. The viewing device 101 communicates an identification of the identified object 1110 to the server 110. The server 110 accesses live data from physical characteristics sensors 112 coupled to the object 1110. The server 110 computes physical characteristics based on the live data and generates a visualization of the computed physical characteristics. The server 110 sends the visualization of the computed physical characteristics to the viewing device 101. The viewing device 101 displays the visualization 1108 on top of the picture 1106 of the object 1110.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
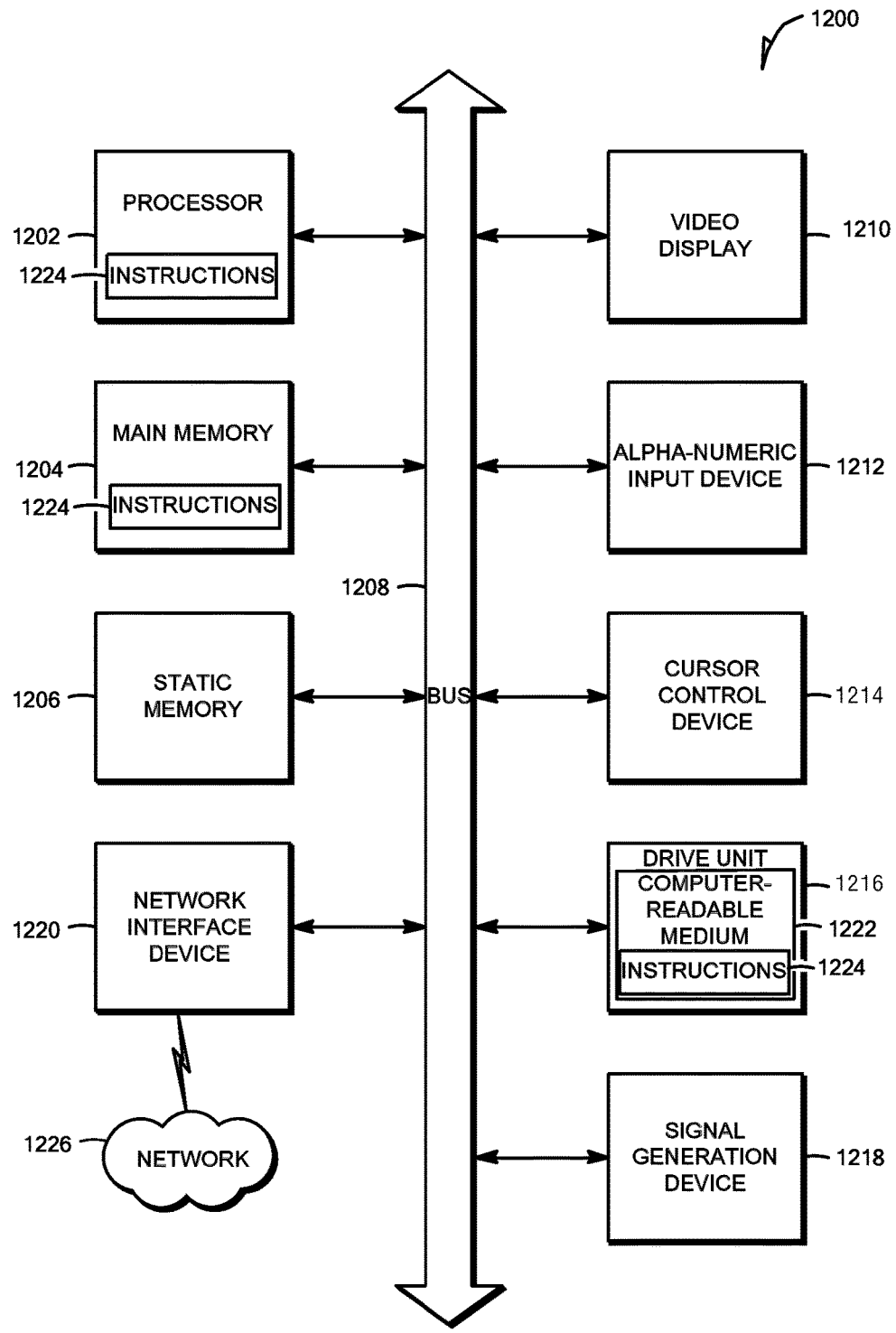
FIG. 12 is a block diagram illustrating components of a machine, according to some example embodiments, able to read instructions from a machine-readable medium and perform any one or more of the methodologies discussed herein.

FIG. 12 is a block diagram of a machine in the example form of a computer system 1200 within which instructions 1224 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communications networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Example Mobile Device

Figure 13:
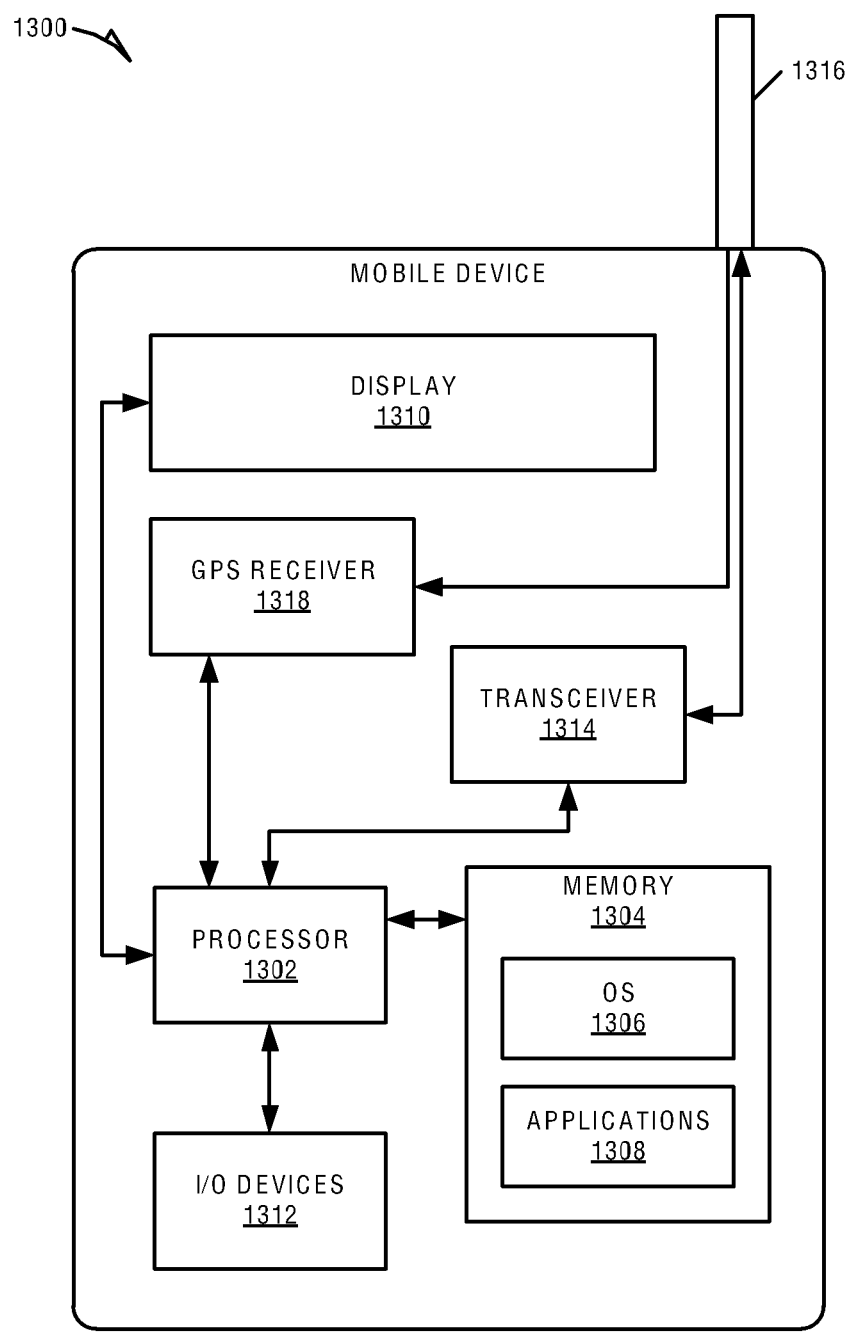
FIG. 13 is a block diagram illustrating a mobile device, according to an example embodiment.

FIG. 13 is a block diagram illustrating a mobile device 1300, according to an example embodiment. The mobile device 1300 may include a processor 1302. The processor 1302 may be any of a variety of different types of commercially available processors 1302 suitable for mobile devices 1300 (for example, an XScale architecture microprocessor, a microprocessor without interlocked pipeline stages (MIPS) architecture processor, or another type of processor 1302). A memory 1304, such as a random access memory (RAM), a flash memory, or other type of memory, is typically accessible to the processor 1302. The memory 1304 may be adapted to store an operating system (OS) 1306, as well as application programs 1308, such as a mobile location enabled application that may provide LBSs to a user. The processor 1302 may be coupled, either directly or via appropriate intermediary hardware, to a display 1310 and to one or more input/output (I/O) devices 1312, such as a keypad, a touch panel sensor, a microphone, and the like. Similarly, in some embodiments, the processor 1302 may be coupled to a transceiver 1314 that interfaces with an antenna 1316. The transceiver 1314 may be configured to both transmit and receive cellular network signals, wireless data signals, or other types of signals via the antenna 1316, depending on the nature of the mobile device 1300. Further, in some configurations, a GPS receiver 1318 may also make use of the antenna 1316 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A server comprising:
a sensor coupled to an object; and
a processor comprising an augmented reality application, the augmented reality application configured to perform operations comprising:
accessing live data generated by the sensor;
computing physical characteristics of the object using the live data;
generating a three-dimensional model of the object using the computed physical characteristics of the object;
generating a visual indicator based on the physical characteristics of the object; and
communicating the three-dimensional model of the object and the visual indicator to a viewing device configured to capture an image of the object, the viewing device being configured to display the three-dimensional model of the object and the visual indicator in a display of the viewing device.

2. The server of claim 1, wherein the operations further comprises:
receiving an identification of the object from the viewing device; and
accessing live data corresponding to the identification of the object.

3. The server of claim 2, wherein the operations further comprises:
communicating the live data to the viewing device,
wherein the viewing device is configured to compute the physical characteristics of the object using the live data, and to generate the visual indicator.

4. The server of claim 3, wherein the viewing device is configured to:
display the visual indicator based on a position of the image of the object in the display of the viewing device.

5. The server of claim 1, wherein the visual indicator comprises at least one of an animation with movements based on the live data, and shapes and colors that change according to the live data.

6. The server of claim 1, wherein the physical characteristics of the object include a weight, a force, a pressure, a heart rate, a pressure rate, or EEG data.

7. The server of claim 1, wherein the operations further comprises:
accessing historical physical characteristics of the object; and generating the visual indicator based on a difference between the physical characteristics of the object and the historical physical characteristics of the object.

8. The server of claim 1, wherein the operations further comprises:
receiving a parameter related to the object from the viewing device, the parameter identifying a second object related to the object;
computing modified physical characteristics of the object based on the live data affected by the parameter;
generating a modified visual indicator based on the modified physical characteristics of the object; and
communicating the modified visual indicator to the viewing device.

9. The server of claim 1, wherein the operations further comprises:
identifying a second object; and
determining that the second object is associated with the object,
wherein the viewing device is configured to capture an image of the second object, and to display the three-dimensional model of the object and the visual indicator on top of the second object in response to determining that the second object is associated with the object.

10. The server of claim 1, wherein the viewing device comprises:
an optical device configured to capture the image of the object; and
a display configured to display the visual indicator in a transparent display, a position and size of the visual indicator in the transparent display based on a position and orientation of the viewing device relative to the object.

11. A method comprising:
accessing live data generated by a sensor coupled to an object;
computing physical characteristics of the object using the live data;
generating a three-dimensional model of the object using the computed physical characteristics of the object;
generating a visual indicator based on the physical characteristics of the object; and
communicating the three-dimensional model of the object and the visual indicator to a viewing device configured to capture an image of the object, the viewing device being configured to display the three-dimensional model of the object and the visual indicator in a display of the viewing device.

12. The method of claim 11, further comprising:
receiving an identification of the object from the viewing device; and
accessing live data corresponding to the identification of the object.

13. The method of claim 12, further comprising:
communicating the live data to the viewing device;
computing the physical characteristics of the object using the live data at the viewing device; and
generating the visual indicator at the viewing device.

14. The method of claim 13, further comprising:
displaying the visual indicator based on a position of the image of the object in the display of the viewing device.

15. The method of claim 11, wherein the visual indicator comprises at least one of an animation with movements based on the live data, and shapes and colors that change according to the live data.

16. The method of claim 11, wherein the physical characteristics of the object include a weight, a force, a pressure, a heart rate, a pressure rate, or EEG data.

17. The method of claim 11, further comprising:
receiving a parameter related to the object from the viewing device, the parameter identifying a second object related to the object;
computing modified physical characteristics of the object based on the live data affected by the parameter;
generating a modified visual indicator based on the modified physical characteristics of the object; and
communicating the modified visual indicator to the viewing device.

18. The method of claim 11, further comprising:
identifying a second object; and
determining that the second object is associated with the object,
wherein the viewing device is configured to capture an image of the second object, and to display the three-dimensional model of the object and the visual indicator on top of the second object in response to determining that the second object is associated with the object.

19. The method of claim 11, further comprising:
capturing the image of the object with an optical device of the viewing device; and
displaying the visual indicator of the physical characteristics of the object in a transparent display of the viewing device, a position and size of the visual indicator in the transparent display based on a position and orientation of the viewing device relative to the object.

20. A non-transitory machine-readable medium comprising instructions that, when executed by one or more processors of a machine, cause the machine to perform operations comprising:
accessing live data generated by a sensor coupled to an object;
computing physical characteristics of the object using the live data;
generating a three-dimensional model of the object using the computed physical characteristics of the object;
generating a visual indicator based on the physical characteristics of the object; and
communicating the three-dimensional model of the object and the visual indicator to a viewing device configured to capture an image of the object, the viewing device being configured to display the three-dimensional model of the object and the visual indicator in a display of the viewing device.

* * * * *